United States Patent Office 3,801,512
Patented Apr. 2, 1974

3,801,512
STABILIZED ACIDIC HYDROGEN PEROXIDE SOLUTIONS
John Carl Solenberger, Wilmington, Del., assignor to E. I. du Pont de Nemours and Company, Wilmington, Del.
No Drawing. Filed Nov. 18, 1971, Ser. No. 200,219
Int. Cl. C01b 15/02; C23f 1/00
U.S. Cl. 252—186
17 Claims

ABSTRACT OF THE DISCLOSURE

Stabilizers are provided for hydrogen peroxide in aqueous solution of up to 80 percent hydrogen peroxide by weight and in acidic solution containing up to about 5 percent hydrogen peroxide by weight, up to 85 percent inorganic acid by weight, up to 5 percent metal ions by weight, and at temperatures up to 90° C. Such stabilizers are included in concentrations up to about 5 percent, preferably up to about 1 percent, by weight, as required, depending on the concentrations of hydrogen peroxide, acid, and metal ions present. The stabilizers include certain substituted anilines, aromatic sulfonic acids, sulfamic acid, sulfolenes, sulfolanes, sulfoxides and sulfones, and mixtures thereof.

BACKGROUND OF THE INVENTION

This invention relates to stabilizers for hydrogen peroxide in acidic aqueous solution and in the presence of metal ions.

Hydrogen peroxide in acid solution, has various industrial uses. An example of such use is the dissolution of metals, such as copper, in etching applications. The stability of hydrogen peroxide in such utilization tends to be seriously degraded by the presence of high concentrations of active metal ions. This results in a considerable economic penalty to the user and has motivated a substantial amount of work in stabilizing hydrogen peroxide in acid solutions, particularly sulfuric acid solution. For example, Lancy U.S. Pat. 3,537,895 discloses the use of fatty acids, e.g., propionic acid, as stabilizers for dilute hydrogen peroxide in sulfuric acid metal etching baths at concentrations of up to 55% sulfuric acid by weight, and Achenback U.S. Pat. 3,373,113 discloses phosphoric acid as a stabilizer for dilute hydrogen peroxide in dilute solutions of sulfuric or nitric acid.

In addition to instability catalyzed by metallic ions, hydrogen peroxide is also subject to degradation induced by pH effects. Liebknecht U.S. Pats. 1,025,948 and 1,058,070 teach the use of sulfanilic acid or aromatic sulfonic acid, respectively, in small amounts to stabilize dilute aqueous hydrogen peroxide solutions. These chemicals are taught as stabilizers to replace the small amounts of strong inorganic acids, especially sulfuric acid, sometimes used for this purpose, and presumably function by a dissociation mechanism to counteract pH induced instability. However, these references relate only to small amounts of acid in large amounts of hydrogen peroxide, whereas the present problem relates to relatively small amounts of hydrogen peroxide in large amounts of acid. Furthermore, these references fail to recognize instability induced by metal ion contamination such as occurs in etching operations.

The problem of hydrogen peroxide instability has taken on even more importance recently with the development of hydrogen peroxide as a means of reducing pollution. An example of this is the abatement of sulfur dioxide emissions, where hydrogen peroxide is used to oxidize sulfur dioxide. Such a use is described in co-pending application Ser. No. 122,229, which relates to the use of a concentrated, hot sulfuric acid solution containing an oxidizing amount of hydrogen peroxide which is contacted with sulfur dioxide. Such use consumes very large amounts of hydrogen peroxide and presents the need for a stabilizer which will stabilize hydrogen peroxide in the concentrated solution in which it is shipped as well as in the dilute, highly acid solution in which it is used. The stabilizer must further be able to function effectively at temperatures up to about 90° C. and in the presence of metal ions and other impurities introduced by corrosion of process equipment.

Although the instability of hydrogen peroxide has been a problem of long standing, up until the present there has been no satisfactory means for stabilizing both concentrated aqueous hydrogen peroxide, as shipped, and also dilute concentrations of hydrogen peroxide in high concentrations of inorganic acids, especially at elevated temperatures and in the presence of quantities of metal ions varying from trace amounts to several percent by weight.

SUMMARY OF THE INVENTION

According to the present invention there is provided an aqueous, acidic, oxidizing solution stabilized against acidic- and metal ion-induced degradation at temperatures from ambient to about 90° C. containing about 0.1 to 5 percent by weight hydrogen peroxide, about 0.5 to 85 percent by weight of a strong inorganic acid, and about 0.01 to 5 percent by weight of a stabilizer selected from the group consisting of aryl sulfonic acids, N,N-lower alkyl anilines, sulfamic acid, sulfolane and sulfolene and their lower alkyl derivatives, dinormal lower alkyl sulfones and sulfoxides, and mixtures thereof. There is also provided a concentrated, i.e., up to about 80 percent by weight, aqueous solution of hydrogen peroxide stabilized by the incorporation of said stabilizer.

DETAILED DESCRIPTION OF THE INVENTION

This invention is useful in chemical processes involving acid solutions containing hydrogen peroxide, metal ions or other impurities. Such impurities encourage loss of hydrogen peroxide and may be introduced into the process solutions by chemical action or by process water, for instance. Two examples are the dissolution of metals by acid solutions containing hydrogen peroxide and the make up of evaporated process water. Both are encountered in controlling sulfur dioxide emissions by oxidizing the sulfur dioxide with hydrogen peroxide in concentrated acid solutions, as described in the aforementioned application Ser. No. 122,229, in which process temperatures as high as 50 to 80° C. and acid concentrations as high as 85 percent by weight, usually about 30 to 85 percent, are used. In such a process the hydrogen peroxide must be stabilized against impurities in plant water concentrated at least about four-fold due to evaporative water losses.

Although the process equipment is engineered insofar as possible with corrosion resistant materials, items such as liquid distributors, pumps, packing supports, baffle plates, and the like, are typically constructed of metal alloys. An example is the Alloy 20 series which consists of metals including iron, chromium, nickel, molybdenum, and copper. As the metal surfaces are corroded away by the concentrated acid and hydrogen peroxide present, metal ions are introduced into solution. The presence of these contaminants leads to a loss of hydrogen peroxide through induced decomposition, resulting in an economic penalty to the user.

While the breakdown of hydrogen peroxide under these conditions cannot be halted entirely, it has been discovered that addition of certain stabilizers to the oxidizing acid solution restricts or greatly reduces the breakdown of hydrogen peroxide.

Of great commercial importance are certain processes in which large amounts of metal ions are intentionally introduced into the acid solutions containing hydrogen peroxide (e.g., copper pickling cleaning, and etching). Here, the hyrdogen peroxide present must be stabilized against fairly substantial amounts of metal ions, e.g., up to about 5 percent copper by weight, and at temperatures up to 70° C.

The present invention provides stable hydrogen peroxide solutions containing up to about 5 percent hydrogen peroxide by weight in concentrated sulfuric or other inorganic strong acid at up to about 85 percent by weight concentration and stabilized by up to about 5 percent, preferably about 0.02 to 1 percent, by weight of a stabilizer selected from the group consisting of aryl-sulfonic acids, N,N-alkyl-anilines, sulfamic acid, sulfolane and sulfolene and their 1 to 4 carbon alkyl derivatives, and dinormal alkyl-sulfones and sulfoxides, and mixtures thereof.

Examples of aryl-sulfonic acids are simple amino-arylsulfonic acids such as sulfanilic acid, and benzene-disulfonic acid, benzenesulfonic acid and their 1 to 4 carbon alkyl substituted derivates, such as para-toluenesulfonic acid. Examples of alkyl-anilines are 1 to 4 carbon dialkyl N,N-anilines and their 1 to 4 carbon alkyl derivatives. Examples of sulfones and sulfoxides are the 1 to 4 carbon dinormal alkyl sulfones and sulfoxides.

The stabilizer may be incorporated in the acid solution before the hydrogen peroxide is added. Preferably, however, the stabilizer will be present in an appropriate amount in the commercial concentrated peroxide which is diluted for or by addition to the solution of sulfuric or other inorganic acid. Such commercial solutions of hydrogen peroxide are prepared and shipped in concentrations of up to about 80 percent, preferably about 20 to 80 percent, more preferably about 30 to 70 percent hydrogen peroxide by weight. These solutions may advantageously contain up to about 5 percent, preferably about 0.1 to 4 percent by weight of a stabilizer of this invention.

The invention is illustrated by the following examples, wherein the percentages of acid and hydrogen peroxide are by weight.

EXAMPLE 1

An aqueous solution containing 47.5% $H_2SO_4$, 1.2% $H_2O_2$, and 24.5 p.p.m. copper as cupric ion ($Cu^{++}$) was divided into five different parts. To four of the parts was added 200 p.p.m. of an organic stabilizer, while the last contained no stabilizer and was used as a standard. All solutions were then placed in a 50° C. water bath. The active oxygen content of each part was measured over a 48 hour time span with the following results:

| Sample | Stabilizer | Active oxygen left, percent | |
|---|---|---|---|
| | | 24 hrs. | 48 hrs. |
| A | | 36.4 | 13.4 |
| B | 200 p.p.m. N,N-diethylaniline | 99.0 | 98.0 |
| C | 200 p.p.m. p-toluenesulfonic acid | 91.8 | 83.7 |
| D | 200 p.p.m. N,N-dipropylaniline | 98.0 | 95.0 |
| E | 200 p.p.m. N,N-dimethylaniline | 99.0 | 98.0 |

EXAMPLE 2

An aqueous solution containing 51.7% $H_2SO_4$, 1.2% $H_2O_2$ and 13.8 p.p.m. iron as ferrous ion was divided into six different parts. To five of the parts were added 200 p.p.m. of an organic stabilizer while the last part contained no additive and was used as a standard. All solutions were then placed in a 50° C. water bath. The active oxygen content of each part was measured over a 72 hour time span with the following results:

| Sample | Stabilizer | Active oxygen left, percent | | |
|---|---|---|---|---|
| | | 24 hrs. | 48 hrs. | 72 hrs. |
| A | | 82.4 | 66.2 | 55.5 |
| B | 200 p.p.m. benzenesulfonic acid | 87.5 | 79.3 | 72.6 |
| C | 200 p.p.m. diethylaniline | 98.0 | 96.0 | 94.0 |
| D | 200 p.p.m. p-toluenesulfonic acid | 93.0 | 88.2 | 83.6 |
| E | 200 p.p.m. sulfanilic acid | 96.4 | 89.5 | 84.2 |

EXAMPLE 3

Samples were prepared as in the previous examples except that the solutions contained 12.2% $H_2SO_4$, 4.4% $H_2O_2$, and 11,000 p.p.m. copper as cupric ion. The temperature was 60° C.

| Sample | Stabilizer | Active oxygen left, percent | | |
|---|---|---|---|---|
| | | 4 hrs. | 8 hrs. | 16 hrs. |
| A | | 53.5 | 25.0 | 6.3 |
| B | 5,000 p.p.m. sulfanilic acid | 86.5 | 73.6 | 54.3 |
| C | 10,000 p.p.m. N,N-diethylaniline | 90.0 | 82.2 | 67.3 |
| D | 5,000 p.p.m. p-toluenesulfonic acid | 96.9 | 93.9 | 88.6 |
| E | 5,000 p.p.m. m-benzenedisulfonic acid | 95.6 | 91.3 | 81.9 |
| F | 5,000 p.p.m. sulfamic acid | 97.3 | 93.8 | 86.9 |

EXAMPLE 4

Samples were prepared as in the previous examples except that the two solutions contained 0.9% $H_2SO_4$, 4.4% $H_2O_2$, and 11,000 p.p.m. copper as cupric ion. The temperature was 60° C.

| Sample | Stabilizer | Active oxygen left, percent | | |
|---|---|---|---|---|
| | | 4 hrs. | 8 hrs. | 16 hrs. |
| A | | 56.0 | 31.5 | 10.0 |
| B | 5,000 p.p.m. p-toluenesulfonic acid | 65.2 | 42.6 | 18.4 |

EXAMPLE 5

Samples were prepared as in the previous examples except that the three solutions used contained 14.3% $H_2SO_4$, 3.5% $H_2O_2$ and 5100 p.p.m. copper as cupric ion. The temperature was 61° C.

| Sample | Stabilizer | Active oxygen left, percent | | |
|---|---|---|---|---|
| | | 4 hrs. | 8 hrs. | 16 hrs. |
| A | | 69.5 | 48.8 | 24.8 |
| B | 200 p.p.m. p-toluenesulfonic acid | 99.0 | 97.8 | 94.3 |
| C | 2,000 p.p.m. sulfolene | 99.0 | 98.0 | 97.0 |

EXAMPLE 6

Samples were prepared as in the prevous examples except that the three solutions contained 80% $H_2SO_4$, 1.7% $H_2O_2$ and 500 p.p.m. copper as cupric ion. The temperature was 80° C.

| Sample | Stabilizer | Active oxygen left, percent | |
|---|---|---|---|
| | | 10 min. | 20 min. |
| A | | 0 | 0 |
| B | 5,000 p.p.m. p-toluene sulfonic acid | 20 | 12 |
| C | 5,000 p.p.m. sulfolene | 20 | 9 |

EXAMPLE 7

Samples were prepared as in the previous examples except that the four solutions contained 40% $H_2SO_4$, 2.54% $H_2O_2$, and 4000 p.p.m. copper as cupric ion. The temperature was 53° C.

| Sample | Stabilizer | Active oxygen left, percent | | |
|---|---|---|---|---|
| | | 4 hrs. | 8 hrs. | 16 hrs. |
| A | | 79 | 67 | 45 |
| B | 5,000 p.p.m. solfolene | 92 | 90 | 84 |
| C | 5,000 p.p.m. di-n-butyl sulfone | 93 | 94 | 90 |
| D | 5,000 p.p.m. di-n-propyl sulfoxide | 96 | 95 | 93 |

EXAMPLE 8

Four percent by weight of p-toluenesulfonic acid, N,N-dipropyl aniline, sulfanilic acid, sulfolene, and dinormal propyl sulfoxide, respectively, are added to separate samples of 30 percent and 70 percent aqueous hydrogen peroxide by weight. Each of the ten samples is stable for at least 5 days at room temperature.

EXAMPLE 9

The procedure of Example 8 is repeated except that the stabilizer concentration is 0.1 percent by weight in each sample. Again, each of the ten samples is stable for at least 5 days at room temperature.

I claim:

1. An aqueous, acidic, oxidizing solution stabilized against acidic- and metal ion-induced degradation at temperatures from ambient to about 90° C. containing about 0.1 to 5 percent by weight hydrogen peroxide, about 30 to 82 percent by weight of a strong inorganic acid, and about 0.01 to 5 percent by weight of a stabilizer selected from the group consisting of aryl sulfonic acids, N,N-lower alkyl anilines, sulfamic acid, sulfolane and sulfolene and their lower alkyl derivatives, dinormal lower alkyl sulfones and sulfoxides, and mixtures thereof; said lower alkyl substituents having from 1 to 4 carbon atoms.

2. The solution of claim 1 wherein the stabilizer is an aryl sulfonic acid.

3. The solution of claim 1 wherein the stabilizer is a N,N-lower alkyl aniline.

4. The solution of claim 1 wherein the stabilizer is a sulfanilic acid.

5. The solution of claim 1 wherein the stabilizer is a sulfamic acid.

6. The solution of claim 1 wherein the stabilizer is selected from the group consisting of sulfolane, sulfolene and their lower alkyl derivatives, said lower alkyl substituent having from 1 to 4 carbon atoms.

7. A solution of claim 1 wherein the stabilizer is selected from the group consisting of dinormal lower alkyl sulfones and sulfoxides.

8. The solution of claim 1 containing about 0.1 to 3 percent by weight hydrogen peroxide.

9. The solution of claim 8 wherein the acid is sulfuric acid and the temperature is about 35 to 90° C.

10. A concentrated acidic aqueous solution of hydrogen peroxide stabilized against acid- and metal ion-induced degradation by about 0.01 to 5 percent by weight of a stabilizer selected from the group consisting of N,N-lower alkyl anilines, sulfamic acid, sulfolane and sulfolene and their lower alkyl derivatives, dinormal lower alkyl sulfones and sulfoxides, and mixtures thereof; said lower alkyl substituents having from 1 to 4 carbon atoms.

11. The solution of claim 10 wherein the stabilizer is a N,N-lower alkyl aniline.

12. The solution of claim 10 wherein the stabilizer is a sulfamic acid.

13. The solution of claim 10 wherein the stabilizer is selected from the group consisting of sulfolane, sulfolene and their lower alkyl derivatives.

14. The solution of claim 10 wherein the stabilizer is selected from the group consisting of dinormal lower alkyl sulfones and sulfoxides.

15. The solution of claim 10 wherein the $H_2O_2$ concentration is about 20 to 80 percent by weight.

16. The solution of claim 10 wherein the hydrogen peroxide concentration is about 30 to 70 percent by weight.

17. The solution of claim 10 wherein the concentration of stabilizer is about 0.1 to 4 percent by weight.

References Cited

UNITED STATES PATENTS

| | | | |
|---|---|---|---|
| 3,194,768 | 7/1965 | Lindner et al. | 252—186 |
| 3,171,767 | 3/1965 | Bellinger et al. | 252—79.4 |
| 3,063,945 | 11/1962 | Blackwell | 252—406 |
| 3,535,392 | 10/1970 | Cormany et al. | 252—406 |
| 1,025,948 | 5/1912 | Liebknecht | 252—402 |
| 1,058,070 | 4/1913 | Liebknecht | 252—406 |
| 3,668,131 | 6/1972 | Banush et al. | 252—79.4 |
| 3,293,093 | 12/1966 | Jones et al. | 252—79.4 |
| 3,245,913 | 4/1966 | Matzner | 252—186 |

OTHER REFERENCES

Condensed Chemical Dictionary, sixth edition, 1961, p. 393.

CARL D. QUARFORTH, Primary Examiner

I. GLUCK, Assistant Examiner

U.S. Cl. X.R.

156—18; 252—79.4, 151, 406; 423—272, 273